United States Patent [19]

Ogiwara

[11] Patent Number: 5,339,531
[45] Date of Patent: Aug. 23, 1994

[54] COORDINATE MEASURING MACHINE

[75] Inventor: Shinichiro Ogiwara, Mitaka, Japan

[73] Assignee: Tokyo Seimitsu, Co., Ltd., Tokyo, Japan

[21] Appl. No.: 10,873

[22] Filed: Jan. 29, 1993

[30] Foreign Application Priority Data

Jan. 30, 1992 [JP] Japan .................. 4-015251

[51] Int. Cl.⁵ .................................................. G01B 5/03
[52] U.S. Cl. ......................................... 33/503; 33/1 M
[58] Field of Search ............... 33/1 M, 503, 504, 556, 33/572, 832

[56] References Cited

U.S. PATENT DOCUMENTS

| | | | |
|---|---|---|---|
| 3,774,311 | 11/1973 | Stemple . | |
| 4,007,544 | 2/1977 | Kirby et al. | 33/503 |
| 4,651,426 | 3/1987 | Band et al. | 33/503 |
| 4,805,314 | 2/1989 | Hayashi et al. . | |
| 4,924,598 | 5/1990 | Gruhler | 33/503 |
| 4,964,221 | 10/1990 | Breyer et al. | 33/503 |
| 5,072,522 | 12/1991 | Stott et al. | 33/503 |

FOREIGN PATENT DOCUMENTS

| | | | |
|---|---|---|---|
| 0237697 | 9/1987 | European Pat. Off. . | |
| 3611686 | 10/1987 | Fed. Rep. of Germany . | |
| 62-265519 | 11/1987 | Japan . | |
| 0214009 | 9/1991 | Japan | 33/503 |
| 1290855 | 9/1972 | United Kingdom | 33/832 |
| 2179452 | 3/1987 | United Kingdom . | |

*Primary Examiner*—Thomas B. Will
*Attorney, Agent, or Firm*—Sixbey, Friedman, Leedom & Ferguson

[57] ABSTRACT

A coordinate measuring machine wherein an X carriage and a Y carriage are rendered light in weight, and the center of gravity of the Y carriage including the X carriage and a Z carriage is disposed close to a driving source, to thereby smoothen the movements of the X carriage and the Y carriage. Driving roller portions and a pair of distributing rollers are provided on the X carriage. A first and second rollers are provided at one end portion and the other end portion of an X-axis guide, so that the wire distributed by the distributing rollers can be guided around the first and second rollers. Then, a third roller is rotatably provided at one end portion of the X-axis guide, so that the wire guided around the second roller can be guided therearound. Further, the Z carriage is connected to one end portion and the other end portion of the wire guided around the driving roller portions and a balance weight is suspended from the wire guided around the first and third rollers to thereby offset the gravity of the Z carriage. With these arrangements, the wire for suspending the Z carriage is disposed along the X-axis guide, so that the Z column can be dispensed with.

8 Claims, 3 Drawing Sheets

COORDINATE MEASURING MACHINE

BACKGROUND OF THE INVENTION

1. Field of the Invention

This invention relates to a coordinate measuring machine, and more particularly to a coordinate measuring machine wherein a probe is moved in three axial directions including X, Y and Z-axis to measure a shape of a workpiece.

2. Description of the Related Art

A 3-dimension coordinate measuring machine is adapted to move a probe in three directions including X, Y and Z-axis to thereby measure a shape and the like of a workpiece. As shown in FIG. 3, a moving mechanism in the direction of the Z-axis (vertical direction) of the 3-dimension coordinate measuring machine has a Z column 10 which is implanted in an X carriage 11 supported movably in an X direction along an X-axis guide 12. A pair of rollers 14 and 16 are rotatably supported at the top end portion of the column 10. A wire 18 is guided around the rollers 14 and 16, and a Z carriage 20 and a balance weight 22 are connected to one end portion and the other end portion of the wire 18, respectively.

The weight of the balance weight 22 is equal to the weight of the Z carriage 20.

Furthermore, a DC servo motor, not shown, is connected to either one of the rollers 14 and 16, and, when the DC servo motor is driven, the Z carriage 20 moves up and down by the wire 18. Accordingly, a probe 24 provided on the Z carriage 20 is positioned at a predetermined position.

However, in the conventional Z-axis moving mechanism, there is a need for raising the bottom end portion of the Z carriage 20 to the X guide 12 during the measuring, whereby it is necessary to set the height of the Z column 10 to a value at least higher than the Z carriage 20. Accordingly, the more the weight of the X carriage is increased, the higher the position of center of gravity becomes, whereby it becomes disadvantageous for moving the X carriage and a Y carriage smoothly, thus causing a hindrance in the accuracy improvement. Furthermore, as a result, the height of the coordinate measuring machine is increased, whereby such disadvantages are caused that, when the ceiling of a building is low, it is difficult to install the coordinate measuring machine, and further, the column 10 should be inclined or removed during the transportation.

SUMMARY OF THE INVENTION

The present invention has been developed to obviate the above-described disadvantages and has as its object the provision of a coordinate measuring machine wherein an X carriage and Y carriage can be smoothly driven to improve the accuracy, and the total height of the coordinate measuring machine may be reduced, so that the coordinate measuring machine may be reduced in a building having a low ceiling and a Z column 10 is not required to be inclined or removed.

To achieve the above-described object, according to the present invention, the coordinate measuring machine wherein a Y carriage is provided movably in a Y-axis direction along a measuring table, an X carriage is provided movably in an X-axis direction along an X-axis guide of the Y carriage, a Z carriage is provided movably in a Z-axis direction on the X carriage, and a probe provided on the Z carriage is moved in the directions of X, Y and Z to measure a shape of an object which is rested on the measuring table, is characterized in that the coordinate measuring machine comprises: a driving roller rotatably provided on the X carriage; a pair of distributing rollers rotatably provided on the X carriage, for distributing a wire guided around the driving roller to directions of opposite end portions of the X-axis guide; a first roller rotatably provided on one end portion of the X-axis guide, for guiding therearound the wire distributed by the pair of distributing rollers in the direction of one end portion of the X-axis guide; a second roller rotatably provided on the other end portion of the X-axis guide, for guiding therearound the wire distributed by the pair of distributing rollers in the direction of the other end portion of the X-axis guide; a third roller rotatably provided on one end portion of the X-axis guide, for guiding therearound the wire guided around the second roller; and a load means suspended from the wire through a suspending roller, for balancing the weight of the Z carriage; whereby the wire is fixed at one end portion thereof to the Z carriage and guided around the driving roller, one of the distributing rollers, the first roller, the suspending roller, the third roller, the second roller, the other of the distributing rollers and the driving roller in the described order, and fixed at the other end portion thereof to the Z carriage.

According to the present invention, the driving roller is rotatably provided on the X carriage, the driving motor is connected to the driving roller, and the pair of distributing rollers are rotatably provided on the X carriage, so that the wire guided around the driving roller can be distributed into two directions to one end portion and the other end portion of the X-axis guide.

Furthermore, the first roller is rotatably provided on one end portion of the X-axis guide, so that the wire distributed by the pair of distributing rollers in the direction of one end portion can be guided therearound. Then, the second roller is rotatably provided on the other end portion of the X-axis guide, so that the wire distributed by the pair of distributing rollers in the direction of the other end portion can be guided therearound, and the third roller is rotatably provided on one end portion of the X-axis guide, so that the wire guided around the second roller can be guided therearound.

Further, the Z carriage is connected to one end portion and the other end portion of the wire, so that the Z carriage can be suspended from the driving roller, and a balance weight is suspended from the wire guided around the first and third rollers through the suspending roller to thereby balance the weight of the Z carriage.

As described above, the wire guided around the driving roller rotatably provided on the X carriage is distributed in the directions to one end portion and the other end portion of the X-axis guide, and the Z carriage and the balance weight are suspended from the wire thus distributed to thereby balance the weight of the Z carriage, so that the Z column which was required can be dispensed with.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of the coordinate measuring machine according to the present invention with reference to the accompanying drawings.

A coordinate measuring machine 30 is provided with a Y carriage 32 which has a pair of columns 32A. The pair of columns 32A are erected on a table 33 through air bearings 32B (Refer to FIG. 2) to be movably in a direction of Y—Y. Opposite both end portions of an X-axis guide 34 are fixed to the top end portions of the pair of columns 32A, and an X carriage 36 is supported on the X-axis guide 34 to be movably in a direction of X—X.

Figure 2:
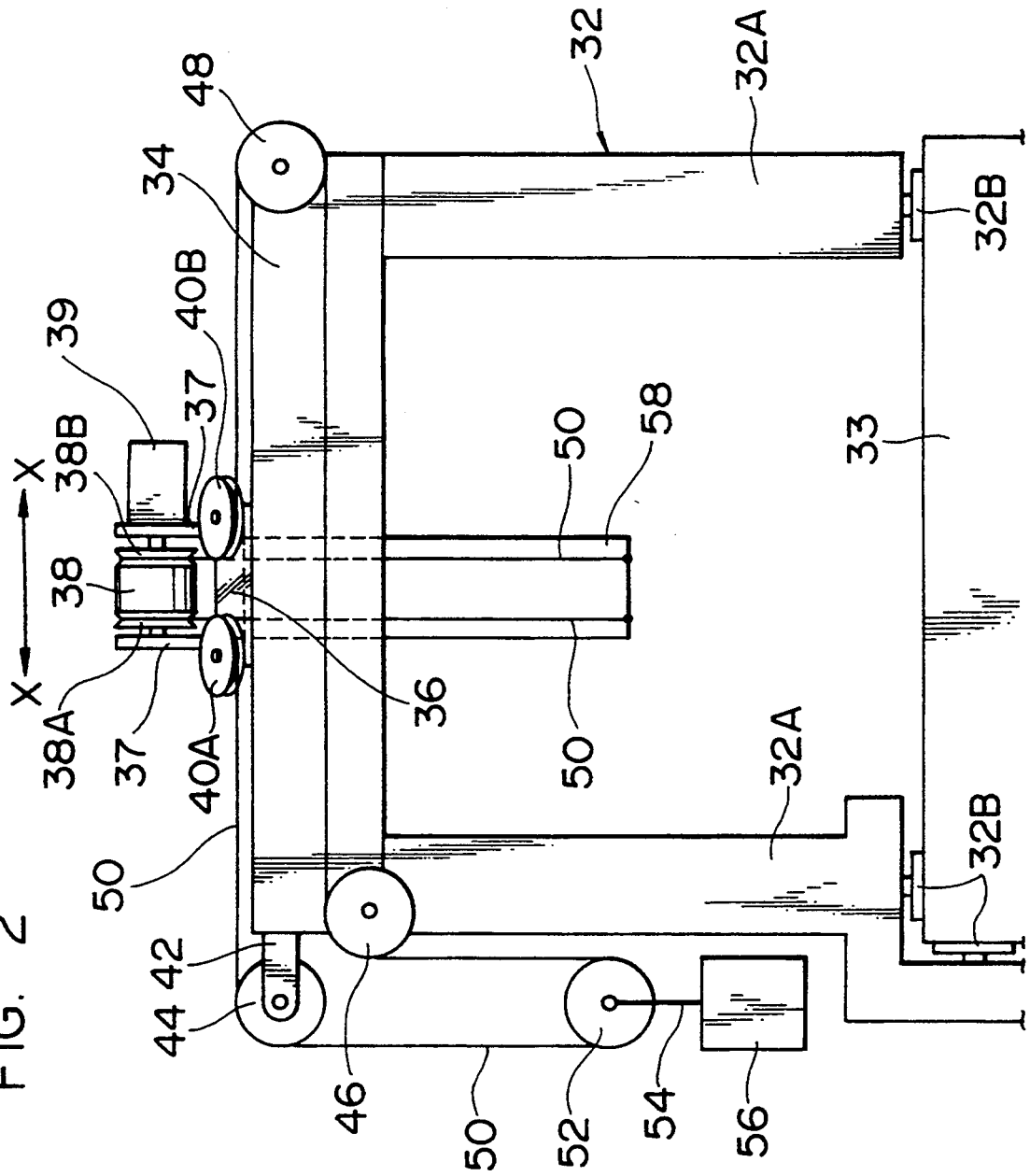
FIG. 2 is a view in the direction indicated by the arrows from the line A—A in FIG. 1.
Figure 3:
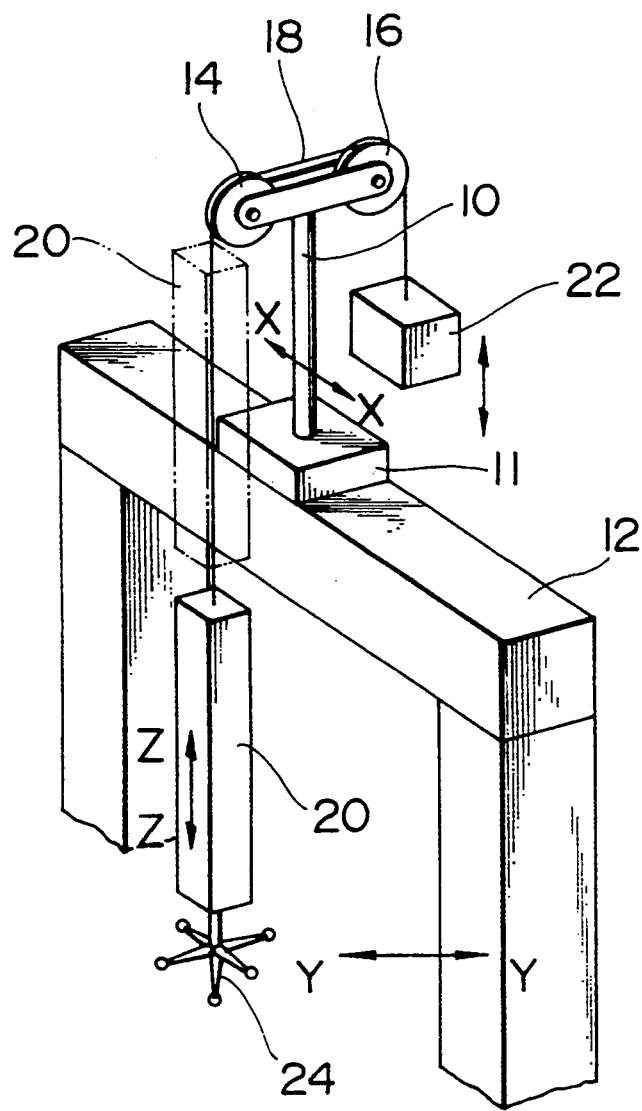
FIG. 3 is a perspective view showing the conventional coordinate measuring machine.

A driving roller 38 is rotatably provided on the upper surface of the X carriage 36 through a pair of brackets 37 (Refer to FIG. 2). Driving roller portions 38A and 38B are rotatably provided on opposite both end portions of the driving roller 38, and a DC servo motor 39 is connected to the driving roller 38. Furthermore, a pair of distributing rollers 40A and 40B are rotatably provided on an inclined surface formed at the back side of the X carriage 36 along this inclined surface.

Figure 1:
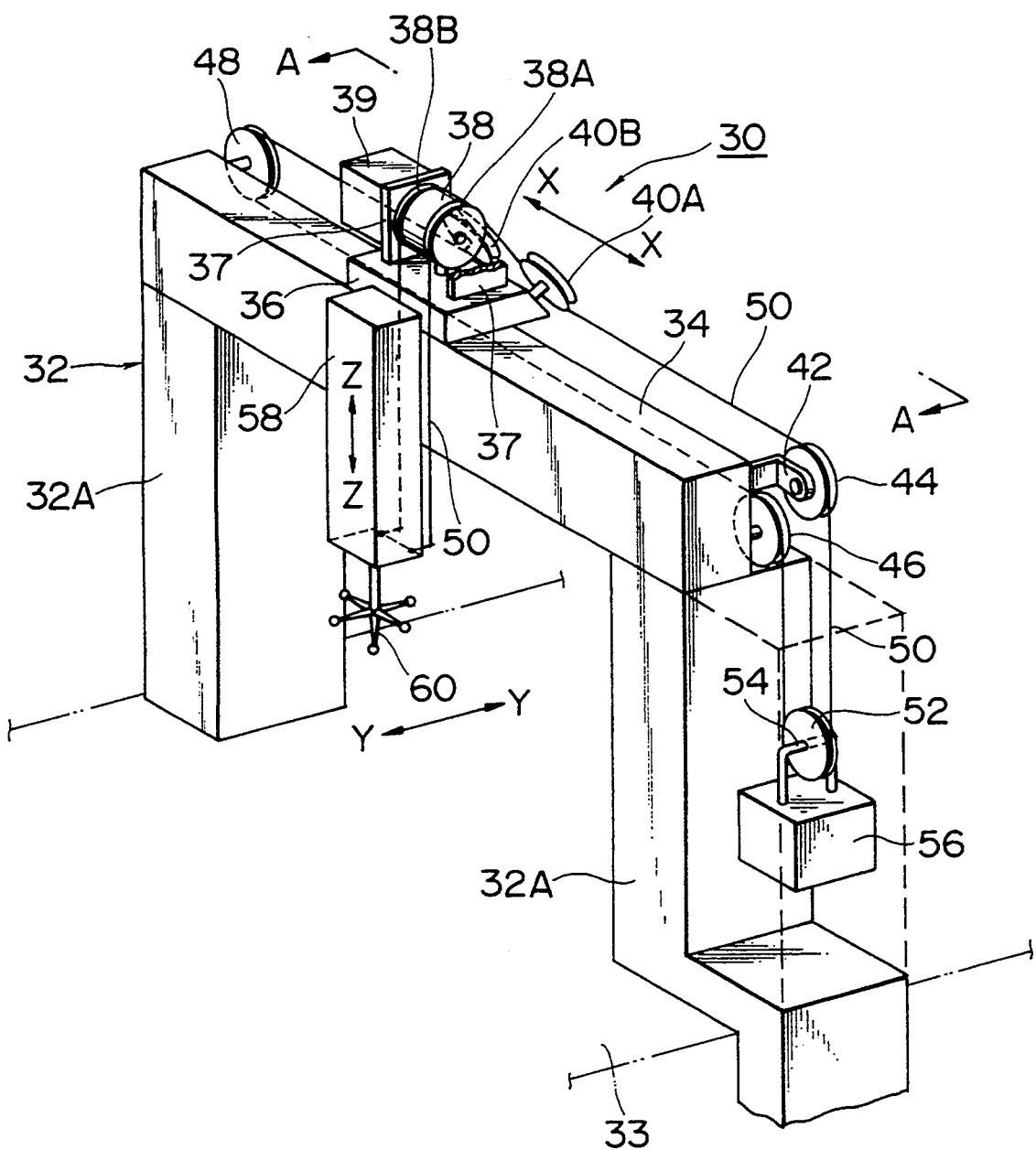
FIG. 1 is a perspective view showing the coordinate measuring machine according to the present invention.

In FIG. 1, a first roller 44 is rotatably provided on the right end portion of the X-axis guide 34 through a bracket 42, and further, a third roller 46 is rotatably supported on the right end portion of the X-axis guide 34 under the first roller 44. A second roller 48 is rotatably provided on the left end portion of the X-axis guide 34. Then, a wire 50 is guided around the driving roller portion 38A, and one end portion of the wire 50 is fixed to a Z carriage 58. Further, the wire 50 guided around the driving roller portion 38A is guided around the distributing rollers 40A and the first roller 44, and the wire 50 guided around the first roller 44 is guided around a suspending roller 52.

The suspending roller 52 is rotatably supported through a rod 54, and a balance weight 56 is fixed to the rod 54. The weight of the balance weight 56 is equal to the weight of the Z carriage 58. Furthermore, the wire 50 guided around the suspending roller 52 is guided around the third roller 46, and further, the wire 50 is guided around the second roller 48. Then, the wire 50 guided around the second roller 48 is guided around the distributing roller 40B and the driving roller portion 38B.

Then, the other end portion of the wire 50 guided around the driving roller portion 38B is connected to the Z carriage 58. Accordingly, one end portion of the wire 50 is fixed to the Z carriage 58, guided around the driving roller portion 38A, the distributing roller 40A, the first roller 44, the suspending roller 52, the third roller 46, the second roller 48, the distributing roller 40B and the driving roller portion 38B in the described order, and the other end portion thereof is connected to the Z carriage 58. With this arrangement, the Z carriage 58 and the balance weight 56 are well-balanced, so that the Z carriage 58 can be stopped at a predetermined position. A probe 60 is provided on this Z carriage 58.

Action of the coordinate measuring machine having the above-described construction according to the present invention will be described.

At first, when the DC servo motor 39 connected to the driving roller 38 is driven to rotate the driving roller portions 38A and 38B, the Z carriage 58 moves up and down. When the Z carriage 58 moves upwardly, the wire 50 extending between the driving roller portions 38A, 38B and the Z carriage 58 moves upwardly, and the balance weight 56 moves downwardly.

Furthermore, when the Z carriage 58 moves downwardly, as the wire 50 between the driving roller portions 38A, 38B and the Z carriage extends downwardly, the balance weight 56 moves upwardly.

Incidentally, when the X carriage 36 moves in the direction X—X along the X-axis guide 34, the balance weight 56 is maintained at a stopped state without moving up and down.

Description has been given of the case in which the driving roller portions 38A and 38B are driven by the DC servo motor to vertically move the Z carriage 58, however, the present invention should not necessarily be limited to this, and the Z carriage may be vertically moved by manual moving.

Furthermore, description has been given of the case in which the balance weight 56 is positioned at the outside of the Y carriage 32 in the above embodiment, however, the present invention should not necessarily be limited to this, and the balance weight 56 may be housed in the column 32A of the Y carriage 32 and vertically moved in the column 32A, represented by the phantom line extension of column 32A in FIG. 1.

Description has been given of the case in which the balance weight 56 is used to balance with the weight of the Z carriage 58 in the above embodiment, however, the present invention should not necessarily be limited to this, and the weight of the Z carriage 58 may be balanced with a load means such as an air pressure cylinder.

Furthermore, description has been given of the case in which the invention of the present application has been applied to the coordinate measuring machine 30 comprising an integrated driving roller in the above embodiment, however, the invention should not necessarily be limited to this, and the invention may be applied to the coordinate measuring machine comprising a pair of driving rollers.

Incidentally, description has been given of the case in which the invention of the present application is applied to the coordinate measuring machine 30 comprising the bridge type Y carriage 32 including the pair of columns in the above embodiment, however the invention should not necessarily be limited to this, and the invention may be applied to the coordinate measuring machine, in which the Y carriage is of an L-shaped carriage (or a cantilever type carriage) for example.

As has been described hereinbefore, in the coordinate measuring machine according to the present invention, the wire guided around the driving roller rotatably provided on the X carriage is distributed in the directions to one end portion and the other end portion of the X-axis guide. Then, the Z carriage is suspended from the wire thus distributed and the balance weight is also suspended from the wire, to thereby balance the weight of the Z carriage.

With this arrangement, the wire suspending the Z carriage can be disposed along the X-axis guide, whereby the Z column which was required can be dispensed with, the X carriage and the Y carriage are decreased in weight and the X carriage and the Y carriage are lowered in center of gravity, so that the X carriage and the Y carriage can be smoothly driven and the accuracy can be improved. Furthermore, the total weight of the coordinate measuring machine can be reduced, so that the coordinate measuring machine can be installed in the building having the low ceiling and the conventional Z column is not required to be inclined or removed during the transportation.

Incidentally, when the balance weight 56 is disposed on the side of the driving source (manual or motor) of the Y carriage, such advantages can be achieved that the bending moment is decreased during the acceleration and deceleration of the Y carriage and the dynamic accuracy is improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A coordinate measuring machine wherein a Y carriage is provided movably in a Y-axis direction along a measuring table, an X carriage is provided movably in an X-axis direction along an X-axis guide of the Y carriage, a Z carriage is provided movably in a Z-axis direction on the X carriage, and a probe provided on the Z carriage is moved in directions X, Y and Z to measure a shape of an object to be measured which is rested on the measuring table, characterized in that said machine comprises: a driving roller rotatably provided on the X carriage; a pair of distributing rollers rotatably provided on the X carriage, for distributing a wire guided around the driving roller to directions of opposite end portions of the X-axis guide; a first roller rotatably provided on one end portion of the X-axis guide, for guiding therearound the wire distributed by one of the pair of distributing rollers in the direction of one end portion of the X-axis guide; a second roller rotatably provided on the other end portion of the X-axis guide, for guiding therearound the wire distributed by other of the pair of distributing rollers in the direction of the other end portion of the X-axis guide; a third roller rotatably provided on one end portion of the X-axis guide, for guiding therearound the wire guided around the second roller; and a load means suspended from the wire through a suspending roller for balancing the weight of the Z carriage; whereby the wire is fixed at one end portion thereof to the Z carriage and guided around the driving roller, one of the distributing rollers, the first roller, the suspending roller, the third roller, the second roller, the other of the distributing rollers and the driving roller in the described order, and fixed at the other end portion thereof to the Z carriage.

2. The coordinate measuring machine as set forth in claim 1, wherein said load means is a balance weight.

3. The coordinate measuring machine as set forth in claim 2, wherein said balance weight is housed in a column of the Y carriage and vertically movable in said column.

4. The coordinate measuring machine as set forth in claim 1, wherein said pair of distributing rollers are inclinedly provided at the side of the X carriage.

5. The coordinate measuring machine as set forth in claim 4, wherein said wire is guided around the driving roller and changed in direction through 90° by the pair of distributing rollers to extend to the first and the second rollers at the opposite end portions of the X-axis guide.

6. The coordinate measuring machine as set forth in claim 5, wherein said driving roller is connected to a driving motor, so that the Z carriage can be vertically moved by the driving force of the driving motor.

7. The coordinate measuring machine as set forth in claim 6, wherein said driving roller is constituted one or a pair.

8. The coordinate measuring machine as set forth in claim 5, wherein said Z carriage can be vertically moved by manual moving.

* * * * *